Feb. 12, 1952   O. M. HANSON   2,585,244
THERMAL DIFFUSION APPARATUS
Filed Sept. 19, 1947   2 SHEETS—SHEET 2
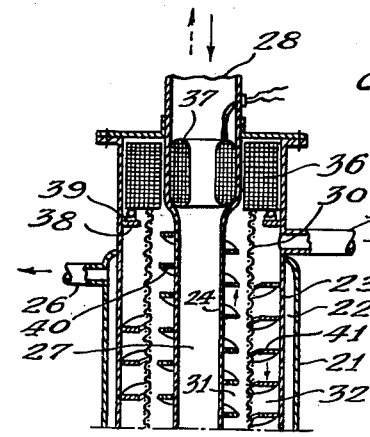
Fig. 5.
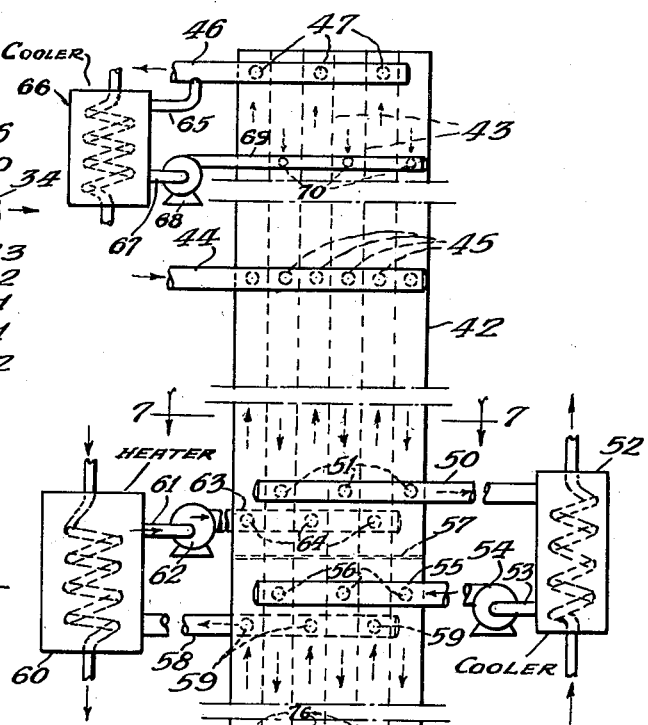
Fig. 6.
Fig. 7.
Inventor:
Olaf M. Hanson
By: Maynard P. Venema
Attorney.

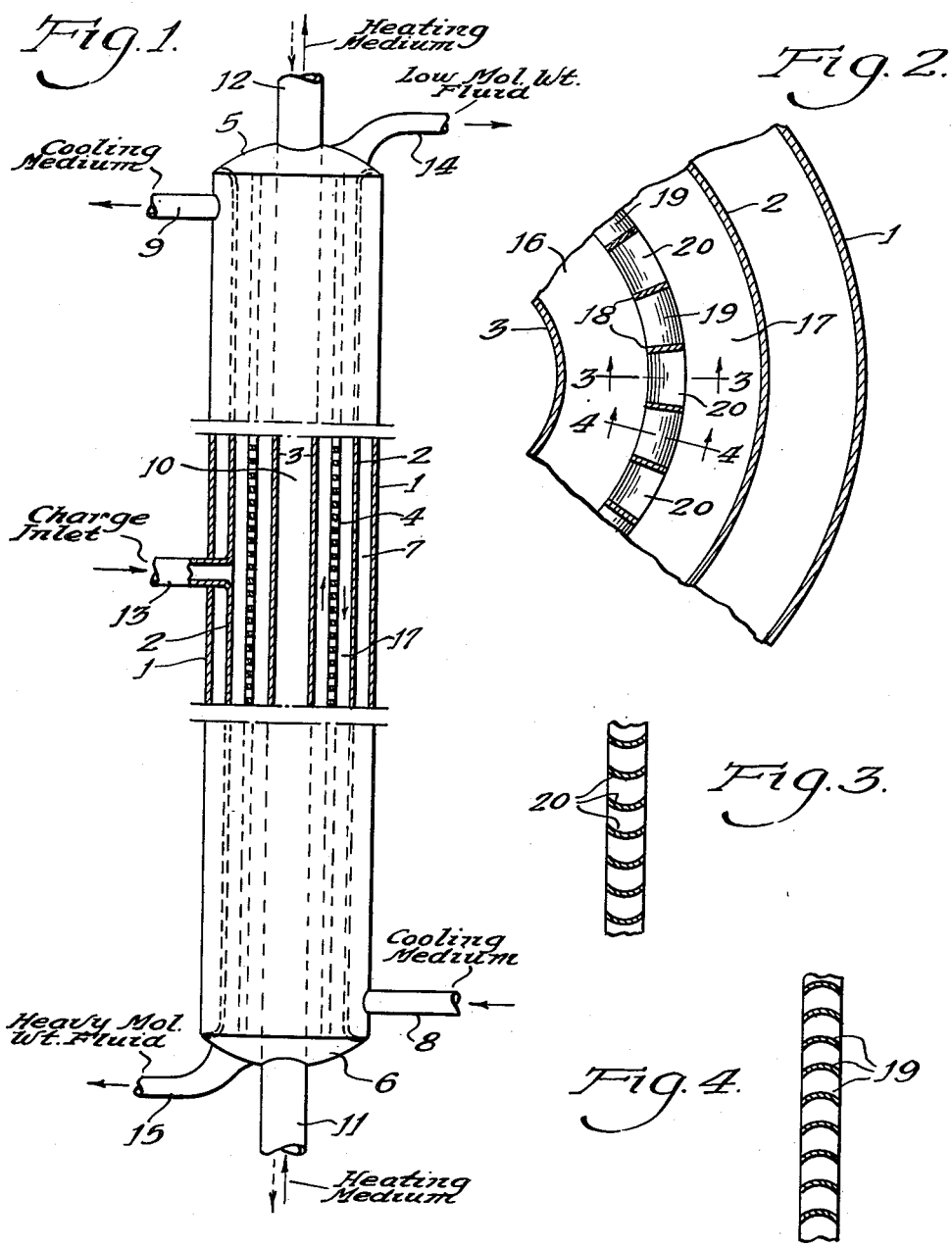

Patented Feb. 12, 1952

2,585,244

UNITED STATES PATENT OFFICE 2,585,244

THERMAL DIFFUSION APPARATUS

Olaf M. Hanson, Chicago, Ill., assignor to Universal Oil Products Company, Chicago, Ill., a corporation of Delaware Application September 19, 1947, Serial No. 774,900

3 Claims. (Cl. 210—52.5)

This invention relates to the use of screens or other perforated partitioning means in an improved thermal diffusion apparatus in order to provide a more effective separation of components from a fluid stream which may be either of a liquid or of a gaseous nature. The screen may be any meshed, perforated or porous membrane having relatively small openings and positioned longitudinally in the separation chamber forming thereby two or more longitudinal flow channels and a resulting increase in the diffusion rate of the charge stream. The screen may also be formed by parallel bars or wires, or by wires or bars crossing but not interlocked, or even by adjacent columns of small baffles.

In diffusion processes and apparatus, utilizing natural convection, separation is effected by countercurrent accumulative streams along opposite walls between which a concentration gradient has been formed. The countercurrent streams are the sum of many superimposed cycles. However, around the main cycles are many smaller cycles or eddies interfering with the overall countercurrent flow, particularly at high temperature differences. The highest velocity occurs away from the walls where the fluid component conversions are the lowest, while along each wall is a fluid film in which the effect of thermal diffusion is greatest, but which moves with a relatively slow velocity. If a screen is placed between a hot stream and an oppositely flowing cold stream, a fluid film will form on both sides of the screen and through it. Through this film the diffusion rate will be high. The total separation can be effected through this film when the heat exchange surfaces are separate from the diffusion apparatus. The purest material in either side of the film will be near the moving stream, away from the solid screen surface, and will be carried most rapidly toward the corresponding end of the separating column. The screen will particularly facilitate the use of forced circulation of the treated fluids.

The principal object of this invention is to provide perforated baffling means within the separation chamber and thereby permit improved and more rapid disassociation of the fluid components of the charge stream.

It is also an object of the invention to provide specially arranged perforated baffling or screens within a separation chamber in a manner to permit charging a fluid stream, which is to be separated, to the apparatus under superatmospheric pressure and at a higher velocity than would be possible with natural convection or gravity separation.

Broadly, the improved apparatus comprises in combination an elongated separation chamber having upper and lower outlets and an intermediately positioned fluid inlet, perforated partitioning means positioned longitudinally within the separation chamber and providing thereby adjacent flow channels whereby a fluid may travel in opposing directions, means for cooling the flow channel or channels accommodating a downwardly moving heavier fluid stream and heating means communicating with the other of said flow channels to heat a lighter upwardly moving fluid.

The perforated baffling may comprise a single screen or a plurality of screens which are spaced apart and extend longitudinally through the entire flow channel of the chamber, and as noted hereinabove may be a meshed or perforated membrane, or may be a specially constructed and perforated baffle having additional advantageous features. The ratio of open area to the total area on the screen, is preferably about 50%, however, a lesser amount of open area, about 20%, will provide an improved concentration gradient and a greater rate of diffusion. A thin membrane permits a more rapid diffusion, but a certain amount of thickness is advantageous since the friction of flow through passages will insure a stable film over and through the screen and a less amount of diffraction eddies along the lower pressure side of the perforated membrane. The screens may also be used in double or multiple layers where it is found desirable to provide increased thickness.

The principal advantage of incorporating a screen in a diffusion chamber is the possibility of greatly improving separating capacity for a given size and cost of apparatus and for a given cost of heating and cooling. There are several definite effects that the placing of the screen in the apparatus accomplishes. One is causing the main convection cycles within the flow channels to be lengthened and the reverse cycles to be decreased where natural convection is used. Another effect is causing the fluid in the opposing flow channels to obtain an efficient and beneficial use of heat radiation from the heating and cooling mediums which are used in conjunction with the apparatus. While still another effect is that the concentration and temperature gradients are greatly improved. The increased concentration gradient is of particular importance in improving the diffusion rate, the added surfaces of the screen or screens permitting fluid films to form along each side thereof, just as fluid films are formed along each of the outer chamber walls.

The temperature change occurring across the screen itself, due to the screen and the fluid films, is greater than along either of the associated heat exchange walls.

Thermal diffusion apparatus at the present time has had rather limited usage principally because of the slow rate of separation, however, the method is particularly beneficial for separating materials having a considerable difference in molecular weights but having very little difference in boiling point, and by providing means for increasing separation rates, the apparatus should have wider usage in the processing industries. Improved diffusion apparatus such as provided by this invention also may be used as a combination reactor and separator, mixing being accomplished at the inlet zone of the apparatus and the flow controlled to provide proper reaction time therein and subsequent separation time in effecting the thermal diffusion into opposing flow streams.

Perforated baffles or screens may be incorporated within thermal diffusion chambers in several ways, and the accompanying drawings illustrate various improved embodiments of thermal diffusion apparatus.

Figure 1 of the drawing shows a simplified form of diffusion apparatus having a single perforated membrane extending longitudinally therethrough.

Figures 2, 3 and 4 of the drawing show a specially constructed type of perforated baffle arranged to improve the rate of separation in a thermal diffusion apparatus.

Figure 5 of the drawing illustrates diagrammatically an improved chamber having means to rotate a screen member within the apparatus and providing thereby means for accommodating a high velocity charge stream.

Figures 6 and 7 of the drawing indicate an alternate form of the apparatus wherein a plurality of screens or perforated members are used to provide a series of flow channels and providing thereby means for accommodating a considerable quantity of a fluid material.

The construction and the advantages of each type will be described independently. However, it may be noted that each type makes use of a screen or series of screens to effect increased efficiency of thermal diffusion.

Referring now to Figure 1 of the drawing, there is shown a cylindrical chamber having an outer wall 1, an intermediate wall 2 and an inner wall 3. The walls 2 and 3 form an elongated annular shaped separation chamber in which there is a perforated screen-like member 4 positioned intermediately between the inner and outer walls 3 and 2. The outer wall of the chamber 1 is spaced from the wall 2 and provides thereby a jacketed zone for passing a cooling or heating medium around the intermediately positioned separation zone. Ends 5 and 6 connect with the walls 1, 2 and 3 and provide thereby enclosed fluid chambers. In the drawings shown, a cooling medium is indicated as being passed through the outer jacketed zone 7 between walls 1 and 2, by means of an inlet connection 8 at the lower end of the apparatus and an outlet 9 at the upper end thereof. A heating medium may be passed through the interior of the apparatus, through the passageway 10 formed by the inner wall of the chamber 3. Inlet and outlet means for the heating medium are provided by the connections 11 and 12 connecting with the passageway 10 at each end of the chamber.

An inlet 13 for the gas or liquid charge is provided at an intermediate point communicating with the separation zone between walls 2 and 3, while an outlet 14 at the upper end of the chamber provides means for discharging the lower molecular weight fluid material and an outlet 15 at the lower end of the chamber provides means for discharging the heavier molecular weight fluid material. The screen 4 preferably extends the entire length of the separation chamber and provides thereby two adjacent annular zones 16 and 17 which will in turn accommodate adjacent flow channels for the fluid component which will be separated from the charge stream. In the embodiment of the apparatus shown, the outer zone 17 being adjacent the outer wall of the cooling jacket, will accumulate the heavier molecular weight component and the flow will be generally downward therein to the outlet 15. The inner flow channel 16 surrounding the heated passageway 10, will accumulate the lighter molecular weight fluid and the flow therein will be generally upward to the top outlet 14.

As noted hereinabove, the perforated baffle or membrane 4 provides inner and outer surfaces intermediately within the separate elongated separation chamber so that the fluid films are formed thereon and an additional zone of temperature differential is provided at this intermediate point and an increased rate of thermal diffusion results thereby.

Figure 2 of the drawing shows a sectional plan view with a specially constructed type of perforated partitioning means indicated within the separation chamber. As in Figure 1 of the drawing, the outer wall is given the numeral 1 and the inner and intermediate walls are indicated by the numerals 3 and 2. The partition is formed of a plurality of vertical members 18 and columns of a multiplicity of superimposed, curved plate segments 19 and 20. As indicated in Figure 3, the latter comprise small curved plate-like segments, spaced and arranged in a vertical column and are concave on their upper surfaces. While as indicated in Figure 4 of the drawing, the alternate columns of superimposed spaced plate-like segments 19 have each segment concave downward.

In thermal diffusion units depending upon natural convection, the accumulative currents are the net results of many superimposed smaller currents or cyclones. The smaller of the cyclones each rotate around and in opposite direction to the main current, and thus interfere with the accumulative currents and decrease the efficiency of separation. The perforated baffle or membrane, as shown in the Figure 2 of the drawing, tends to eliminate and greatly reduce the smaller cyclones that oppose the main currents. The action of the baffles consists of scooping fluid from the downward stream on the cold side, in channel 17 into the hot stream within channel 16 along the alternate vertical columns provided by segments 20, while the alternate columns provided by segments 19, tend to scoop the fluid from the upwardly flowing hot stream in zone 16 into the cooler stream within zone 17. The scooping action provides a balance between the pressures due to the greater density of the cold fluid and the expansion of the heated fluid, which is ordinarily accomplished by the superimposed currents or cyclones, substituting continuous columns of semi-cyclones for consecutive whole cycles otherwise resulting and further substituting horizontal components for the interfering reverse cyclones occurring in an unbaffled separation chamber.

This type of baffle screen is particularly applicable to the treatment of low viscosity fluid in an apparatus where considerable temperature differences may be obtained between the inner and outer walls and where there is a relatively large spacing between the cool and hot walls of the chamber.

Referring now to Figure 5 of the drawing, there is illustrated in an elevational view, partially in section, a more elaborate type of thermal diffusion apparatus which will accommodate a charge stream at a relatively high velocity and pressure. As in the simpler embodiment, the outer wall of the chamber 21 provides a jacketed space 22 for a heat exchange medium to pass around the outer wall 23 of the separation chamber being provided between wall 23 and the inner wall 24. The heat exchange medium passing through the zone 22 may be charged to the latter through inlet 25 and discharged therefrom through outlet 26. The inner wall of the chamber 24, as before, provides a passageway 27 in which a different heat exchange medium may be passed therethrough by way of upper and lower fluid connections 28 and 29. A cylindrical screen 30 extends longitudinally through the elongated separation chamber between walls 23 and 24 and forms 2 annular adjacent flow channels 31 and 32. A centrally positioned inlet 33 provides means for charging fluid to the interior of the separation zone, while an upper outlet 34 provides means for discharging the lighter molecular weight fluid material and the outlet 35 at the lower end of the chamber provides means for discharging the heavier molecular weight fluid component.

Attached to the upper end of the screen 30 there is means furnished for rotating it within the separation chamber while the fluid material is discharged thereto. Various types of mechanical means may be provided to accomplish the rotation of the screen, however, in the embodiment shown, the rotor 36 of an induction motor is attached to the screen in the upper end of the enclosed fluid separation zone. The stator 37 of the induction motor, is housed within the upper end of the passageway 27 and it is thus removed from the separation zone by means of the upper portion of the inner wall 24. A supporting ring 38 and suitable rotor bearing 39 placed on the upper side of the ring can prvoide means for supporting the rotor 36 while permitting its rotation with the screen. In this embodiment of the apparatus, helical baffles are provided within each of the flow channels 31 and 32 of the separation zone. In the inner flow channel a spiral baffle 40 encompasses the inner wall 24, and as indicated, spirals upwardly around the heated passageway 27 such that the lighter fluid component is channeled to the upper portion of the chamber and can be discharged through outlet 34. In the outer zone 32, a spiral baffle 41 angling downwardly therethrough, is effective to channel the flow of the heavier fluid component to the lower end of the chamber whereby it may be discharged to the outlet 35. The rotation of the screen causes rotation of the fluid on each side thereof and tends to distribute the charge stream longitudinally throughout the elongated separation chamber. The fluid within the separation zone will, however, lag behind the screen as it rotates, such that the fluid film on each side thereof will be substantially maintained and thermal diffusion will continue to operate to separate the lighter and heavier molecular weight components of the fluid charge.

It may be pointed out that the spiral baffles 40 and 41, not only provide directional baffling of the fluid streams, but also act as heat distributing fins into each of the separated flow channels 31 and 32. The baffle 40 acts as a heat radiating member from the wall 24 and from the heated passageway 27, while the baffle 41 functions as a cooling fin within the outer zone 32, being cooled by the cooling medium within the jacketed zone 22.

The apparatus of Figure 5 is also particularly useful as both a reactor and a separator since it permits the charge stream to be admitted at a higher velocity than is possible with the simpler type of thermal diffusion apparatus. The rotating screen also provides adequate mixing at the inlet zone so that the desired reaction may take place prior to the subsequent separation within the separate flow channels.

In Figures 6 and 7 there is shown still another form of thermal diffusion apparatus using perforated partitioning means to provide an increased rate of thermal diffusion and to provide a plurality of flow channels. Figure 7 is a sectional plan view through the apparatus of Figure 6 as indicated by the line 7—7. An elongated chamber 42 is provided with a plurality of perforated partitioning members 43, which extend through the entire length thereof, and divide the interior into a plurality of adjacent flow channels. The fluid charged to the chamber 42 is admitted through a header 44 which in turn distributes to each of the flow channels through short conduits or tubes 45. The outlet header 46 at the upper end of the unit, with outlet conduits 47 connecting thereto from alternate flow channels, provides means for removing the lower molecular weight fluid component from the separation chamber. Similarly, a header 48 having connecting conduits 49, is positioned at the lower end of the unit and connects with the alternate flow channels to remove the heavier molecular weight fluid material from the separation chamber.

In this type of unit means is provided for connecting both heating and cooling heat exchangers with the various flow channels formed between the perforated plates or screens 43. A header 50, with conduits 51 connecting with the chamber 42 and with one set of flow channels, provides means for withdrawing fluid from each of the latter and passing it through a cooler 52. The cooled stream from the cooler 52 passes through line 53 and a blower or pump 54 to a distributing header 55. The latter distributes the cooled fluid to a lower section of the unit through conduits 56. The lower section of the unit receiving the cooled medium is separated from the section above by means of a non-perforated baffle plate 57.

Accommodating the fluid in the alternate flow channels is a header 58, connecting to the chamber and channels by way of conduits 59; thus the latter withdraw fluid therefrom and pass it to a heater 60 wherein the fluid stream is raised to a higher temperature. The increased temperature stream is discharged from the heater 60 through an outlet conduit 61 and a blower or pump 62 to a distributing header 63 connecting with an upper section of the unit. The header 63, having short discharge conduits 64, communicates with the unit above the separating plate 57 and with alternative flow channels with respect to those communicating with the cooler 52. The heater 60 effects an overall upward flow in the channels with which it communicates, while the cooler 52 effects a downward flow in the alternate flow channels with which it communicates.

At the upper end of the unit a line 65 withdraws a portion of the lower molecular weight product stream and cools it in cooler 66. The cooled reflux stream is passed by way of line 67, circulator 68, header 69, and distributing conduits 70, to the flow channels alternate to those from which the light product is withdrawn. Conversely, at the lower end of the unit a line 71 withdraws a portion of the heavy product stream and heats it within heater 72. The heated reflux stream is passed by way of line 73, a circulator 74, header 75, and distributing conduits 76 to the flow channels alternate to those from which the heavy product is withdrawn. The flow circulating means 54, 62, 68 and 74 will of course be blowers or pumps, depending upon whether or not the fluid being handled is a gaseous or liquid medium.

This latter form of thermal diffusion apparatus may be readily constructed to accommodate large quantities of a fluid charged and to effect relatively rapid separation of a stream being charged thereto. While the accompanying drawing and the above description indicate that only two coolers and two heaters are used in connection with the unit, it is obvious that the apparatus can be divided into more vertical sections by additional baffles similar to 57 and a plurality of coolers and heaters made use of to increase the cooling and heating effects of the fluid medium and to provide an increased rate of thermal diffusion within the unit.

Figures 1 and 5 of the drawing show the heating medium passing internally through the unit and the cooling medium circulating externally around the separation chamber. However, it is not intended to limit the construction to this flow. The heating medium may comprise steam, flue gases, or other fluid medium suitable for conducting heat to the apparatus. The cooling medium may comprise a refrigerant, cold water, or other fluid streams which may circulate readily within the apparatus.

Further, it is not intended to limit the improved thermal diffusion apparatus to any particular process operation. Broadly, it is adaptable for separating components of any fluid stream where they have rather close boiling points but considerable differences in molecular weight. It is good for separating components of constant-boiling mixtures. It is also useful for separating the products of reversible reactions which yield unsuitable products or products difficult to separate in a purified form. As examples of the first name condition, blends of benzene with ethyl alcohol and of normal pentane with diethyl ether, may be considered. The components of each blend boil within one or two degrees of each other, but their molecular weights show great differences. Examples of constant-boiling mixtures are the water-ethanol and water-HCl azeotropes. Both ethanol and HCl have considerably higher molecular weights than water.

An example of the advantageous use of the apparatus for producing products of an easily reversible reaction, is the production of aliphatic Schiff's bases. Methyl-ethyl ketone reacts with isopropyl amine in the presence of a dehydrating agent which may be excess isopropyl amine to yield isopropyl-secondary butylidene-amine and water. With a thermal diffusion column, the complications of solid dehydrating agents can be avoided, since the small water molecules tend to leave the column with the excess of isopropyl amine.

Thermal diffusion in combination with phase change also provides a useful operation particularly for the recovery of valuable portions present in low concentrations from large volumes of a gas or gases, and the improved apparatus of this invention may well be employed. For example, propane and ethane may be recovered from large volumes of natural gas, or perfume oils from flowers may be extracted by currents of inert gas, and other similar operations may be carried out.

I claim as my invention:

1. A thermal diffusion apparatus comprising in combination, an elongated separation chamber having upper and lower outlets and an intermediately positioned fluid inlet, a plurality of spaced screens extending longitudinally through said chamber and forming therein a plurality of adjacent intercommunicating flow channels, fluid heating means connecting with said chamber and alternate channels of said spaced plurality of flow channels, and fluid cooling means connecting to said chamber and to the remaining alternately spaced fluid flow channels.

2. A thermal diffusion apparatus comprising in combination an elongated separation chamber, a plurality of spaced screens extending longitudinally through said chamber, and forming therein a plurality of adjacent intercommunicating flow channels, inlet means for charging fluid to said chamber at a point intermediate its length, an outlet header at the upper end of said chamber connecting with a set of alternately spaced flow channels, an outlet header connecting with the lower end of said chamber and the remaining alternately spaced flow channels, imperforate partitioning means dividing said chamber into vertical superimposed sections, cooling means and heating means outside said chamber, header and conduit means for withdrawing fluid from above said partitioning means and from said remaining alternately spaced flow channels accommodating descending fluid flow and for passing said fluid to said cooling means, conduit and distribution means for returning cooled fluid from said cooling means to said chamber and to said remaining flow channels below said partitioning means, header and conduit means for withdrawing fluid from below said partitioning means and from said set of alternately spaced flow channels accommodating ascending fluid flow and for passing said fluid to said heating means, conduit means for returning heated fluid from said heating means to said chamber and the last-mentioned flow channels above said partitioning, and fluid circulating means in said conduits to force circulation of each stream between said superimposed sections.

3. A thermal diffusion apparatus comprising in combination an elongated separation chamber, a plurality of spaced screens extending longitudinally through said chamber, and forming therein a plurality of adjacent intercommunicating flow channels, inlet means for charging fluid to said chamber at a point intermediate along its length, an outlet header at the upper end of said chamber connecting with a set of alternately spaced flow channels, an outlet header connecting with the lower end of said chamber and the remaining alternately spaced flow channels, heat producing heat exchange means extending internally within each of said alternate flow channels having an upper outlet, cooling means extending internally within each of the other of said flow channels which have an outlet at the lower end thereof, and fluid circulating devices in each of said flow channels arranged to provide an initial impulse in the direction of the outlet in each channel.

OLAF M. HANSON.

REFERENCES CITED

The following references are of record in the file of this patent:

UNITED STATES PATENTS

| Number | Name | Date |
|---|---|---|
| 2,158,238 | Hvid | May 16, 1939 |
| 2,258,594 | Brewer et al. | Oct. 14, 1941 |
| 2,268,134 | Clusius | Dec. 30, 1941 |
| 2,390,115 | McNitt | Dec. 4, 1945 |